Jan. 6, 1970 J. A. COON 3,487,731
HOLE SPACER

Filed Dec. 27, 1967 2 Sheets-Sheet 1

INVENTOR
James A. Coon

BY *[signature]*

ATTORNEY

Jan. 6, 1970  J. A. COON  3,487,731
HOLE SPACER
Filed Dec. 27, 1967  2 Sheets-Sheet 2
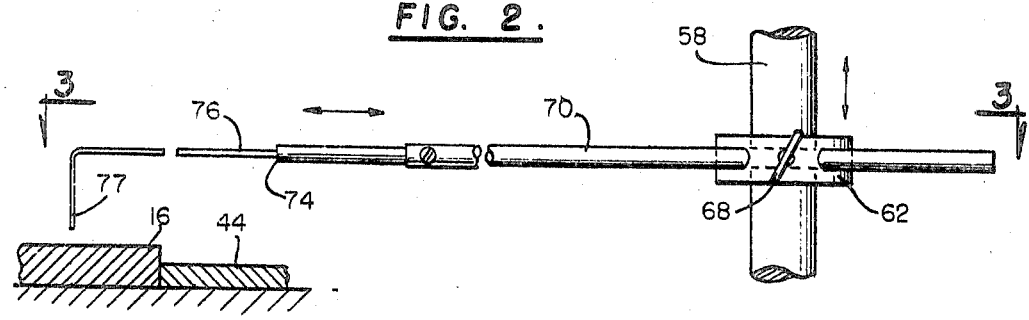
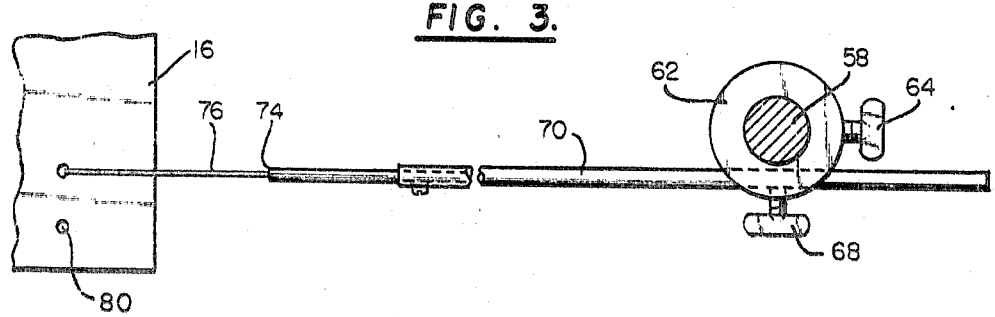
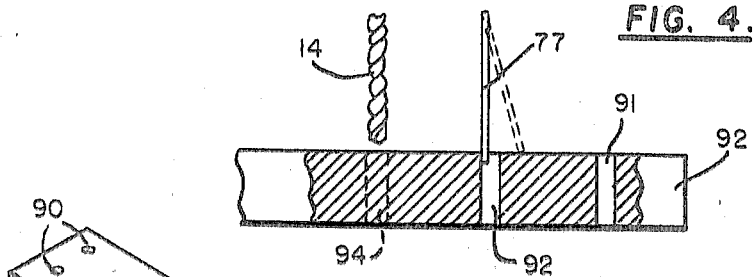
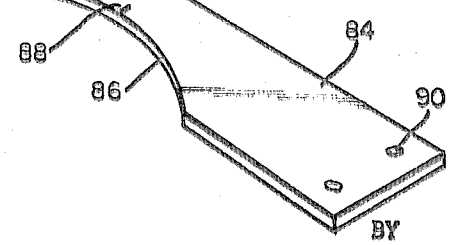
INVENTOR
James A. Coon
BY
ATTORNEY

United States Patent Office 3,487,731
Patented Jan. 6, 1970

3,487,731
HOLE SPACER
James A. Coon, 929 Drever St.,
West Sacramento, Calif. 95691
Filed Dec. 27, 1967, Ser. No. 693,985
Int. Cl. B23b 47/00, 49/00
U.S. Cl. 77—55                                    11 Claims

ABSTRACT OF THE DISCLOSURE

A "feeler" is arranged in a previously drilled hole and is mounted in a predetermined relation to the bit of a drill so that a second hole can be drilled at a point spaced from the "feeler" a distance as predetermined. Successive holes are similarly drilled, thus providing for the drilling of a succession of equally spaced holes.

BACKGROUND OF THE INVENTION

The invention relates to the field of electric drills wherein a drillhead of conventional type supports a driven drill bit movable downwardly to drill holes. Ordinarily, where it is desired to drill a succession of equally spaced holes, points are marked on the work to indicate the successive centers of the holes to be drilled. Particularly where a succession of articles is to be similarly drilled, this is a slow and time-consuming operation.

SUMMARY OF THE INVENTION

A collar is provided carrying a transverse supporting plate the ends of which respectively carry slidable forwardly extending parallel bars, the forward ends of which carry a longitudinal work engaging straight edge or guide against which work is to be positioned for the drilling of openings therethrough. The collar may be releasably attached to the column of a standard drill press.

A supporting bar extends transversely of the apparatus and carries a slidable collar, which in turn carries a vertical rod on which is arranged a vertically adjustable collar. The latter collar supports a forwardly extending stem terminating at its forward end in a downturned spring "feeler" engageable in an opening already drilled. The various slidable adjustments referred to allow the "feeler" to be adjusted vertically, horizontally, and transversely for the positioning of the feeler in an opening. Thus, the feeler may be arranged at any desired distance from the drill bit to facilitate the successive drilling of openings, the same distance apart, namely, the horizontal distance between the feeler and the drill. The feeler is adapted to extend very slightly into a drill opening. The feeler being of spring material permits the work, after the drilling of each opening, to be moved along the work guide, the feeler flexing to slide along the surface of the work until it engages the previously drilled opening. This operation will be repeated as many times as desired to drill the necessary number of openings.

When not in use, the collar may be loosened and the entire assembly rotated to an out-of-the-way position so that the drill press may be free for normal operation.

BRIEF DESCRIPTION OF THE DRAWINGS

FIGURE 2 is a side elevation of the feeler device and the supporting rod therefor, the work and work guide being shown in section;

FIGURE 3 is a sectional line 3—3 of FIGURE 2;

FIGURE 4 is an enlarged fragmentary sectional view showing the feeler engaged in a drilled opening with the drill bit ready to be lowered to drill the next succeeding opening; and FIGURE 5 is a perspective view of a modified type of work guide which may be employed in place of a straight edge.

DESCRIPTION OF THE PREFERRED EMBODIMENTS

Figure 1:
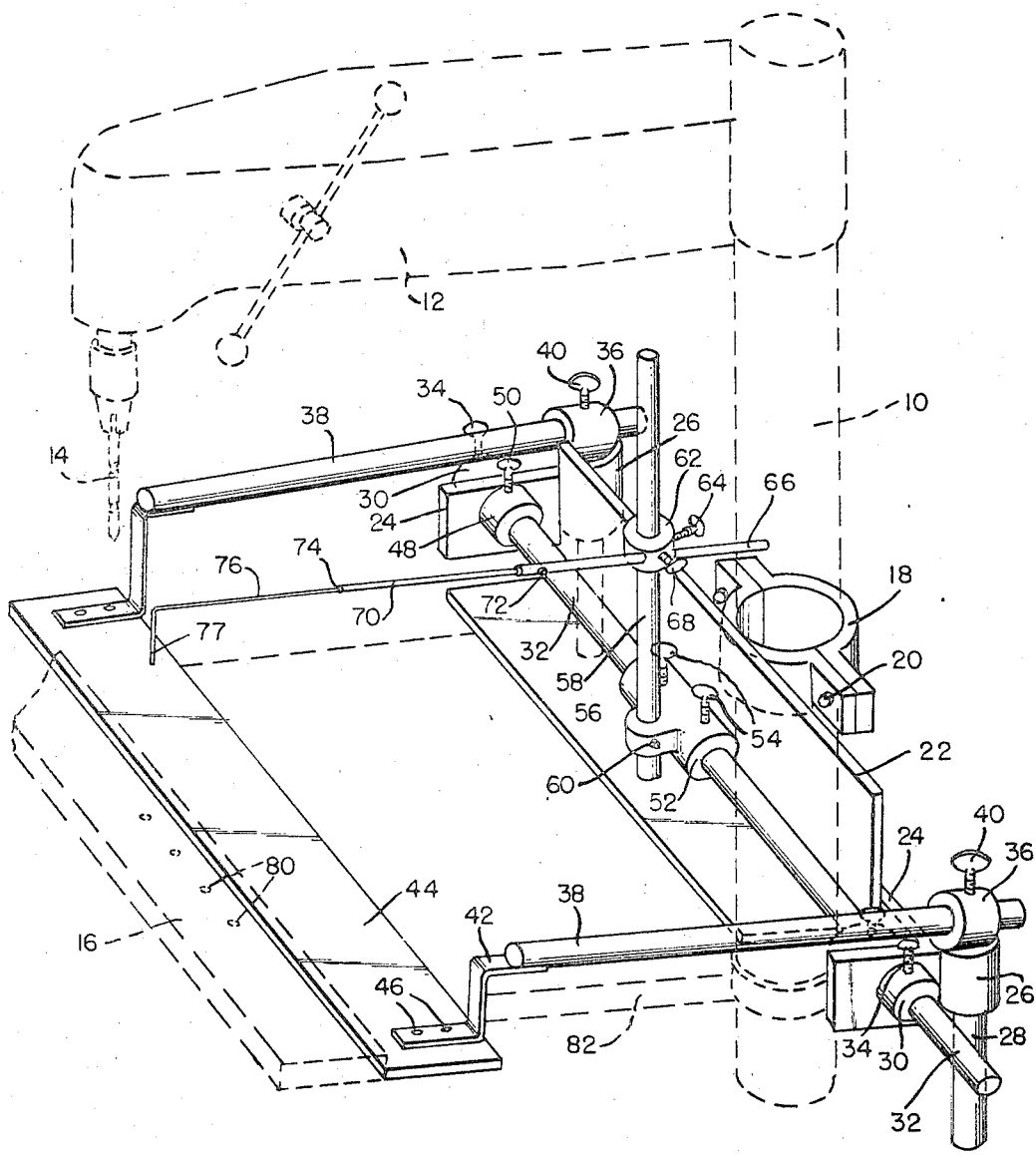
FIGURE 1 is a perspective view of the device, the drill press associated elements being shown in dotted lines.

Referring to FIGURE 1, the numeral 10 designates a rigid vertical standard supporting at its upper end a drill press 12, carrying the usual motor mechanism (not shown) for rotating a drill bit 14, movable downwardly by conventional means to drill one or more openings in the work 16.

A horizontal supporting collar 18 is releasably mounted on the column 10 and secured thereto by bolts 20. Welded to the collar 18 is a transverse support 22 in the form of a heavy plate arranged in a vertical plane and having its ends welded to angle brackets 24, each angle bracket being welded to a vertical collar 26, carried by a stem 28. Each of the angle brackets 24 carries a collar 30 welded thereto and such collars slidably support a transverse rod 32 adapted to be fixed with respect to the collars 30 by thumb screws 34.

Each of the stems 28 has welded to the top thereof a horizontal collar 36 in which is arranged a forwardly extending rod 38. These rods are parallel and are slidable through collars 36, and are adapted to be fixed in adjusted positions by thumb screws 40.

At their forward ends, the rods 38 carry Z-brackets 42, the lower ends of which support a work guide 44, shown in the present instance as a straight edge. The ends of rods 38 may alternatively be bent to Z form if desired, and brackets 42 omitted. In the illustrative embodiment however, each bracket 42 is secured to a straight edge 44 by a pair of screws 46, and the upper end of each bracket 42 is similarly secured to the associated rod 38, thus rigidly fixing the straight edge against any movement longitudinally thereof.

By virtue of the sliding arrangement of stems 28 and their attached collars 36, the previously described assembly may be raised or lowered as a unit. The utility of this feature will be more fully pointed out hereinafter.

The rod 32, as stated, is slidable in collars 30. If desired, two more collars 48 may be arranged inwardly of the brackets 24 and fixed with respect to the rod 32 by thumb screws 50. Only one set of supporting collars for the rod 32, however, is necessary. This rod supports immediate its ends an elongated collar 52, adapted to be fixed in adjusted position along the rod 32 by thumb screws or wing nuts 54.

The collar 52 carries a forward extending integral lug 56 receiving an upstanding stem 58 secured in lug 56 by an Allen screw 60. Above the rod 32, the stem 58 supports a vertically slidable collar 62 secured in adjusted position on the stem 58 by a wing nut or the like 64.

Eccentrically thereof, the collar 62 carries a relatively small tubular member 66, slidable therethrough, forwardly and rearwardly of the apparatus, and this member 66 is adapted to be fixed with respect to the collar 62 by a wing nut 68. A relatively thin stem 70 is slidable into the tubular member 66 and is adapted to be fixed in adjustive positions by any suitable means such as an Allen screw 72. The member 70 is reduced at 74 to provide a relatively thin spring finger 76 the forward end of which is turned downwardly as at 77 to form a feeler. This feeler, as further described below, may be arranged at any predetermined horizontal distance from the drill bit 14 to drill a series of equidistantly spaced holes in the work, for example, the holes 80 in FIGURE 1. These holes may be drilled while the work is engaged with the straight edge 44, the work being moved slidably along the straight edge to successive drilling positions. While engaging such straight edge, the work is supported on a stationary bed plate 82, or false table if desired. It may here be pointed out that in some instances, such as when drilling holes entirely through a work piece, the provision of a false table, such as a piece of wood or the like, preferably covering the entire drill press table, is essential in order to protect the drill press table from damage.

The assembly of parts in FIGURE 1 has been particularly illustrated with respect to a straight edge 44 for drilling a succession of aligned openings. The straight edge, however, may be replaced by other forms of work guiding pieces. For example, in FIGURE 6, a work guide 84 is illustrated, having an arcuate recess 86, cut in its forward edge and marked intermediate its length as at 88 in alignment with the vertical plane of the drill bit. Screw holes 90 are provided for the reception of screws 46. Work guide 84, or any other desired shape or form of work guide may be substituted for straight edge 44 merely by removing screws 46 and re-utilizing the same to secure the substituted work piece.

In the use of the device, as suggested in FIGURE 4, the feeler 77 will be arranged a desired distance from the drill bit 14. A first hole 91 will be drilled in the work 92 which may be wood, metal, plastic or any other material. The feeler finger is then arranged in the top of the opening 91, projecting only slightly below the surface of the work. With the feeler engaged against the left-hand side of the opening 91, the drill bit will be properly centered for the drilling of the next opening. The drill is moved downwardly to drill such opening, indicated by numeral 92. The work is then moved toward the right of FIGURE 4, and because of the resiliency of the finger 77 the lower end thereof will flex upwardly and to the left. As the work is pushed to the right the feeler travels to the left and falls into the new hole just bored, the flexing of the feeler being indicated in dotted lines in FIGURE 4. When the feeler snaps downwardly to the solid line position in FIGURE 4, the drill is ready to drill the third opening, indicated in dotted lines by the numeral 94. This operation is carried on successively until the desired number of openings has been drilled.

The drilling of openings in a work piece may be provided along lines varying in distance from the rear edge of the work piece, that is, the edge engaging the straight edge 44. Loosening the thumb screws 68, the feeler may be moved forwardly or rearwardly to center the feeler finger 77 centrally over the desired line of openings.

Similarly, by raising stems 28 as previously described, a work piece may be moved all the way back against plate 22, permitting holes to be bored a considerable distance from the edge of the work. In such cases the assembly consisting of rods 38 and straight edge 44 may be removed entirely, and plate 22 used as the straight edge. Raising of the unit is also necessary where a succession of holes are to be drilled in a raised or built up section positioned on a base which extends inwardly too great a distance toward the work guide to permit normal access of the drill thereto.

Since it is very desirable that the feeler finger engage in successive openings only slightly below the top surface of the work, it is desirable to vary the height of the lower end of the feeler finger in accordance with the thickness of the work. This may be done very readily by loosening the wing nut 64 and moving the collar 62 vertically to properly position the lower end of the feeler finger 77, as shown for example in FIGURE 4. Of course, it is also necessary to vary the horizontal distance between the feeler finger 77 and the drill bit 14, according to the desired distance between the openings to be drilled. This is preferably accomplished by loosening wing nut 64 and turning collar 62 on shaft 58 right or left to the degree desired. Due to the radial extension of finger 77 on rods 70, 74 and 76 a very slight turn of the collar 62 imparts a considerable lateral position change to finger 77. An alternative means is provided through the slidable mounting of the collar 52, on the rod 32. The wing nuts 54 may be loosened to slide the collar 52 along the rod 32 to vary the horizontal distance between the feeler finger and the center of the drill bit. Of course, instead of loosening the nut 54, the nuts 34 and 50 may be loosened if desired to free the stem 58 for horizontal movement along the axis of the rod 32.

It is desirable to adapt the machine to the drilling of openings through members of other shapes, for example, circular members such as wheels or discs. To this end the work guide 84 (FIGURE 5) is preferably provided. A circular article of the same diameter as the arcuate recess 86 may be engaged with such recess and rotated successive steps for the drilling of successive openings. In such case, the feeler finger 7 will not be spaced from the center of the drill bit in a plane parallel to the edges of the work guide. Because of the curvature of the work piece, it will be necessary to advance the feeler finger 77 forwardly, this being readily done by loosening the nut 68 and sliding the feeler finger forward the desired distance.

In drilling a succession of openings in a circular piece the latter piece will be aranged with the center point of the first opening in radial alignment with the mark 88. The finger will be arranged to the right of such center point in FIGURE 5, and after the first hole has been drilled, the work will be rotated in the recess 86 until the feeler finger snaps into the first drilled opening. The second opening may be drilled, whereupon the drill is raised and the work piece rotated another step until the feeler finger snaps into the second opening. This operation is repeated until the desired number of openings has been drilled.

From the foregoing it will be apparent that the present apparatus is highly effective for use in drilling a succession of equidistantly spaced openings through various materials of different thicknessses, with the openings at any desired distance from the edge of the work piece. The feeler finger is free to be adjusted in three linear directions, namely, axially forwardly and rearwardly, verticaly and transversely, as well as radially by means of collar 62. The feeler finger always may be arranged to engage only slightly within a drilled opening so that it is necessary only to move the work to properly position the drill for drilling the next hole. The resilient feeler finger flexes to ride over the surface of the work piece as suggested in FIGURE 4, and then snaps into its position to place the drill bit into proper position to drill the next succeeding opening.

While the instant invention has been described particularly in connection with a drill press, it is to be understood that the hole spacer may also be advantageously utilized with other types of machinery for spacing purposes. In those instances where the machine does not have a column to which collar 18 may be attached, the device may be clamped or bolted directly to the work table.

From the foregoing it will now be seen that there is herein provided an improved hole spacer which accomplishes all of the objects of this invention and others, including many advantages of great practical utility and commercial importance.

As various embodiments may be made of this inventive concept, and as many modifications may be made in the embodiments hereinbefore shown and described, it is to be understood that all matter herein is to be interpreted merely as illustrative, and not in a limiting sense.

I claim:

1. A hole spacer for drills comprising a feeler finger arranged parallel to and spaced a predetermined distance from the drill and engageable in a pre-drilled hole to space the drill from such hole said predetermined distance for the drilling of a second hole, and means for supporting said feeler finger for linear horizontal axial, horizontal lateral, vertical and radial movement relative to the drill, 2. A hole spacer according to claim 1 wherein said feeler finger is resilient and is extendable only slightly into a pre-drilled hole to space the drill from such hole for the drilling of said second hole, whereby, when the work is moved, the feeler finger will flex upwardly and outwardly and slide over the surface of the work to engage the second drilled opening and position the drill for the next drilling operation.

3. A hole spacer according to claim 1 wherein said means comprises a transverse support, a collar slidable longitudinally on said support, a vertical member vertically slidably supported by said collar, and a forwardly extending feeler finger forwardly and rearwardly slidably supported by said vertical member, whereby said feeler finger is adjustable forwardly and rearwardly, vertically and transversely, relative to the drill.

4. A hole spacer according to claim 3 wherein said feeler finger is arranged parallel to the axis of the drill and is formed of highly resilient material whereby, with the lower end of the feeler finger extending in a drill opening only slightly below the surface of the work, the feeler finger, upon movement of the work, will be flexed angularly upwardly to slide over the surface of the work to engage another drilled opening.

5. A hole spacer according to claim 4 wherein said vertical member is a steam of circular cross section, and a collar vertically slidable on said stem, and having means for fixing it in adjustive positions thereon, said feeler finger being slidable in said collar.

6. A hole spacer according to claim 5 wherein said transverse support is in the form of a bar of circular cross section, a collar slidably adjustable along said bar, and means for fixing the lower end of said vertical member to said last named collar.

7. A hole spacer according to claim 6 provided with a transverse supporting plate suporting said bar, forwardly extending rods adjacent the ends of said plate and fixed with respect thereto, and a work guide carried by the forward ends of said rods and having an edge against which the work is slidable to position it for the successive drilling of openings.

8. A hole spacer according to claim 7 wherein said work guide is removable.

9. A hole spacer according to claim 8 wherein a plurality of interchangeable work guides are provided.

10. A hole spacer according to claim 9 wherein the drill is provided with a supporting standard, and means for fixing said plate to said standard.

11. A hole spacer according to claim 10 provided with a tubular member slidable horizontally through said collar on said vertical stem, said feeler finger being carried by said tubular member.

References Cited
UNITED STATES PATENTS 2,674,906    4/1954    Timpner _____ 77—55

FRANCIS S. HUSAR, Primary Examiner